(12) United States Patent
Woodell et al.

(10) Patent No.: US 7,292,178 B1
(45) Date of Patent: Nov. 6, 2007

(54) AIRCRAFT HAZARD DETECTION AND ALERTING IN TERMINAL AREAS

(75) Inventors: Daniel L. Woodell, Robins, IA (US); Roy E. Robertson, Marion, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/191,883

(22) Filed: Jul. 28, 2005

(51) Int. Cl.
*G01S 13/95* (2006.01)
*G01S 13/04* (2006.01)
*G01S 13/58* (2006.01)

(52) U.S. Cl. .................... 342/26 B; 342/26 R; 342/27; 342/28; 342/104; 342/175; 342/176; 342/181; 342/182; 342/192; 342/195

(58) Field of Classification Search .... 342/26 R–26 D, 342/27, 28, 104–116, 175, 192–197, 176–186; 702/1–4; 73/170.01, 170.02, 170.11, 170.16, 73/170.24
See application file for complete search history.

(56) References Cited

U.S. PATENT DOCUMENTS

| | | | |
|---|---|---|---|
| 3,212,085 A * | 10/1965 | Lhermitte et al. ........ 342/26 D |
| 4,023,408 A | 5/1977 | Ryan et al. |
| 4,060,910 A | 12/1977 | Gell, Jr. |
| 4,198,635 A | 4/1980 | Gell, Jr. |
| 4,225,867 A | 9/1980 | Gell |
| 4,313,726 A | 2/1982 | Chase .......................... 434/42 |
| 4,649,388 A * | 3/1987 | Atlas ........................ 342/26 D |
| 4,796,153 A | 1/1989 | Amason et al. |
| RE33,152 E * | 1/1990 | Atlas ........................ 342/26 R |
| 5,111,400 A | 5/1992 | Yoder |
| 5,130,712 A * | 7/1992 | Rubin et al. ............... 342/26 D |
| 5,140,523 A * | 8/1992 | Frankel et al. ................. 702/4 |
| 5,198,819 A | 3/1993 | Susnjara |
| 5,262,782 A * | 11/1993 | Rubin et al. ............... 342/26 D |
| 5,265,024 A | 11/1993 | Crabill et al. |
| 5,323,170 A | 6/1994 | Lang .......................... 343/872 |
| 5,359,330 A * | 10/1994 | Rubin et al. ............... 342/26 D |
| 5,371,505 A | 12/1994 | Michaels .................... 342/360 |
| 5,432,895 A | 7/1995 | Myers |
| 5,490,239 A | 2/1996 | Myers |
| 5,615,118 A | 3/1997 | Frank |
| 5,648,782 A * | 7/1997 | Albo et al. ................ 342/26 D |
| 5,751,289 A | 5/1998 | Myers |

(Continued)

OTHER PUBLICATIONS

T. Maese et al., "Preliminary Results of At-Sea Testing with the Lockheed Martic Tactical Environmental Processor"; paper delivered at the BACIMO 2000 Conference in Fort Collins, Colorado, USA, Apr. 24-27, 2000.*

(Continued)

*Primary Examiner*—Bernarr E. Gregory
(74) *Attorney, Agent, or Firm*—Nathan O. Jensen; Kyle Eppele (57) ABSTRACT

A weather radar system or method can be utilized to determine potential weather hazard for an aircraft in a terminal area. The weather radar system can utilize processing electronics coupled to an antenna. The processing electronics can determine presence of the potential in response to data related to returns received by the weather radar antenna. The data can include a mean velocity parameter or a spectral width parameter or reflectivity.

33 Claims, 5 Drawing Sheets

U.S. PATENT DOCUMENTS

| | | | |
|---|---|---|---|
| 5,757,322 A | 5/1998 | Ray et al. | 342/460 |
| 5,771,020 A | 6/1998 | Markson et al. | 342/460 |
| 5,945,926 A | 8/1999 | Ammar et al. | |
| 5,959,567 A * | 9/1999 | Wolfson et al. | 342/26 R |
| 5,973,635 A * | 10/1999 | Albo | 342/26 D |
| 5,978,715 A | 11/1999 | Briffe et al. | 701/11 |
| 6,014,606 A | 1/2000 | Tu | 701/200 |
| 6,038,498 A | 3/2000 | Briffe et al. | 701/3 |
| 6,097,996 A | 8/2000 | Deker | 701/10 |
| 6,112,141 A | 8/2000 | Briffe et al. | 701/14 |
| 6,163,756 A | 12/2000 | Baron et al. | 702/3 |
| 6,215,294 B1 | 4/2001 | Coleman | |
| 6,240,369 B1 | 5/2001 | Foust | 702/3 |
| 6,246,367 B1 | 6/2001 | Markson et al. | 342/460 |
| 6,272,433 B2 | 8/2001 | Baron et al. | 702/3 |
| 6,275,231 B1 | 8/2001 | Obradovich | |
| 6,285,298 B1 | 9/2001 | Gordon | 340/945 |
| 6,356,843 B1 | 3/2002 | Baron et al. | 702/3 |
| 6,377,207 B1 | 4/2002 | Solheim et al. | 342/351 |
| 6,381,538 B1 | 4/2002 | Robinson et al. | 701/211 |
| 6,405,133 B1 | 6/2002 | Schwinn et al. | 702/4 |
| 6,405,134 B1 * | 6/2002 | Smith et al. | 702/4 |
| 6,456,226 B1 | 9/2002 | Zheng et al. | |
| 6,480,142 B1 * | 11/2002 | Rubin | 342/26 R |
| 6,501,392 B2 | 12/2002 | Gremmert et al. | 340/971 |
| 6,542,825 B2 | 4/2003 | Jones et al. | 702/3 |
| 6,560,538 B2 | 5/2003 | Schwinn et al. | 702/4 |
| 6,577,947 B1 | 6/2003 | Kronfeld et al. | 701/202 |
| 6,590,529 B2 | 7/2003 | Schwoegler | 342/357.13 |
| 6,606,564 B2 | 8/2003 | Schwinn et al. | 702/4 |
| 6,650,972 B1 | 11/2003 | Robinson et al. | 701/3 |

OTHER PUBLICATIONS

"The Vertical Profile of Radar Reflectivity of Convective Cells: A Strong Indicator of Storm Intensity And Lightning Probability?" by Zipser and Lutz, *Monthly Weather Review* (Aug. 1994, vol. 122, pp. 1751-1759).

* cited by examiner

AIRCRAFT HAZARD DETECTION AND ALERTING IN TERMINAL AREAS

FIELD OF THE INVENTION

The present application relates generally to the identification of hazards or potential hazards. More particularly, the present application relates to a method of and a system for identifying hazards using a weather radar system.

BACKGROUND OF THE INVENTION

U.S. Pat. No. 6,424,288 invented by Daniel L. Woodell and assigned to the assignee of the present application discloses a system for and methods of displaying radar information using weather radar systems. Weather radar systems generally include an antenna, a receiver/transmitter circuit, a processor, and display. The processor is coupled between the display and the receiver/transmitter circuit. The receiver/transmitter circuit is coupled between the processor and the antenna.

The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color display providing graphical images in color to represent the severity of weather. Some aircraft weather radar systems also include other hazard detection systems such as a turbulence detection system. The turbulence detection system can provide indications of the presence of turbulence or other hazards. Conventional weather radar systems include those manufactured by Rockwell Collins, Inc., Honeywell International, Inc. and others.

An article entitled "The Vertical Profile of Radar Reflectivity of Convective Cells: A Strong Indicator of Storm Intensity And Lightning Probability?" by Zipser and Lutz, *Monthly Weather Review* (August 1994, vol. 122, pp. 1751–1759) discusses the use of reflectivity data from Doppler radars and temperature readings to determine a lightning hazard. U.S. Pat. No. 6,405,134 discloses a system and method for predicting areas where lightning strikes are likely to occur by evaluating radar data and temperature data.

The system uses radar data associated with radar composite reflectivity. Weather can be particularly problematic as an aircraft approaches the terminal area. Operation near the terminal area (takeoff and approach) are critical periods of flight in which an aircraft moves only a few tens of knots above stall speed. Accordingly, turbulent environments, gust conditions and lightning can be particularly hazardous during an aircraft's takeoff and approach.

Radial wind gusts can cause the air speed of the aircraft to momentarily fall below stall speed with the resulting momentary attitude upset and possible hazardous loss of control. Radial wind gusts are wind gusts that are directed toward or away from the heading of an aircraft. Wind gusts perpendicular to the aircraft velocity cause yaw attitude disturbances and force the aircraft off the proper ground track for the approach or takeoff. Aircraft pilot's manuals recommend increasing approach and takeoff airspeed in terminal areas where gust conditions are present.

Generally, aircraft approach speeds are selected to provide a 30–50 knot (15–26M/S) margin above stall speed. When gust conditions are detected or reported along the approach path, speed is increased according to aircraft pilot's manuals to provide additional margin. For small general aviation or regional aircraft, the amount of speed increase is approximately equal to the peak gust speed. For larger air transport aircraft that have higher overall approach speeds, the amount of speed increase may be less. For example, the pilot may only be interested in peak gusts exceeding 10 knots in larger transport aircraft.

Pilots conventionally receive information about gust conditions through forecasts prior to takeoff, through pilot reports, or through ground-based instruments relayed through air-traffic control. Forecasts and pilot reports can be disadvantageous because they can be out-of-date and unreliable as fast moving storm systems move through the airport terminal area. Ground-based instruments, such as ground-based gust detection systems, can only provide approximate estimates of gust magnitudes at higher altitudes associated with the approach and takeoff.

With respect to lightning hazards, aircraft operating in terminal areas conventionally come closer to convective activity or convective weather cells than while in a cruise mode. Operating near convective activity may induce a lightning strike that can cause a maintenance action and even ground the aircraft. Total avoidance of convective activity is not an option in the terminal area because the aircraft must depart and land in coordination with other aircraft. In the terminal area, aircrafts generally follow the following rule: If the aircraft in front of my aircraft successfully departs or land through a weather cell, my aircraft will as well.

Lightning sensors have been designed for aircraft. However, NASA studies have shown that 90% of lightning strikes on aircraft are induced by the aircraft itself as it travels through an electrified environment and that lightning strikes are not often the result of a lightning bolt randomly hitting the aircraft. The NASA studies also show that 60% of all lightning strikes on an aircraft had neither visually detectable lightning before nor after the recorded strike on the aircraft. Accordingly, while a lightning detector may be a good identifier of a convective cell over a longer length of time, a lightning sensor cannot guarantee timely detection of a potential lightning strike in the short exposure time associated with terminal areas.

Applicants believe that the large number of strikes without either a precursor or subsequent strike can be understood in light of aircraft actively avoiding regions of high level radar reflectivity that occur during both the early and mature stages of a thunderstorm's development. Aircraft begin to operate in the vicinity of cells during the dissipating stages of a thunderstorm's life as radar reflectivity falls. Although the dissipating reflectivity may seem insufficient to denote an electrified cell, the cell has been charged earlier in its life. The aircraft penetrating the environment near the dissipating but still charged cell may act as a trigger to allow the cell to discharge through the aircraft.

This phenomenon highlights the need to identify cells and their stages of development. There is a need to identify a potential lightning producing cell, often a cell that needs to be identified as a risk even after it no longer meets the hazard triggering thresholds for some period of time.

Thus, there is a need for a system for and a method of predicting hazards in the terminal area using a weather radar system. Further still, there is a need for real time or pseudo-real time hazards determination using an aircraft weather radar system. Yet further, there is a need for a weather radar system optimized to determine the potential for lightning and/or wind gusts. Yet further still, there is a need for a system that automatically detects gust strength and lightning potential so that a pilot can more accurately avoid hazardous conditions in a terminal area. There is also a need for a weather radar system that can determine and display lightning and/or wind gust hazards. Even further, there is a need for a weather radar system that can identify potential lightning hazard areas.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a weather radar system. The weather radar system includes a weather radar antenna and processing electronics. The processing electronics are coupled to the weather radar antenna and determine a potential hazard. The processing electronics determine a reflectivity parameter, a spectral width parameter, or a mean velocity parameter. The reflectivity parameter, the spectral width parameter, and the mean velocity parameter are related to returns received by the weather radar antenna. The processing electronics determines the potential hazard in a terminal area based upon at least one of the reflectivity parameter, spectral width parameter, or the mean velocity parameter.

Another exemplary embodiment relates to a method of displaying a potential hazard in a terminal area of an aircraft radar system. The method includes receiving radar returns, determining a first parameter related to the radar returns, determining a location of the aircraft radar system being in the terminal area, and providing an indication of the potential hazard based upon the first parameter. The first parameter can be related to a reflectivity, a spectral width, or a mean velocity.

Yet another exemplary embodiment relates to an apparatus for determining a potential hazard for an aircraft. The apparatus includes means for determining a first factor from the weather radar returns, means for determining a presence of the potential hazard in response to the first factor and the aircraft being in the terminal area, and means for displaying the potential hazard. The first factor is a spectral width or a mean velocity. Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
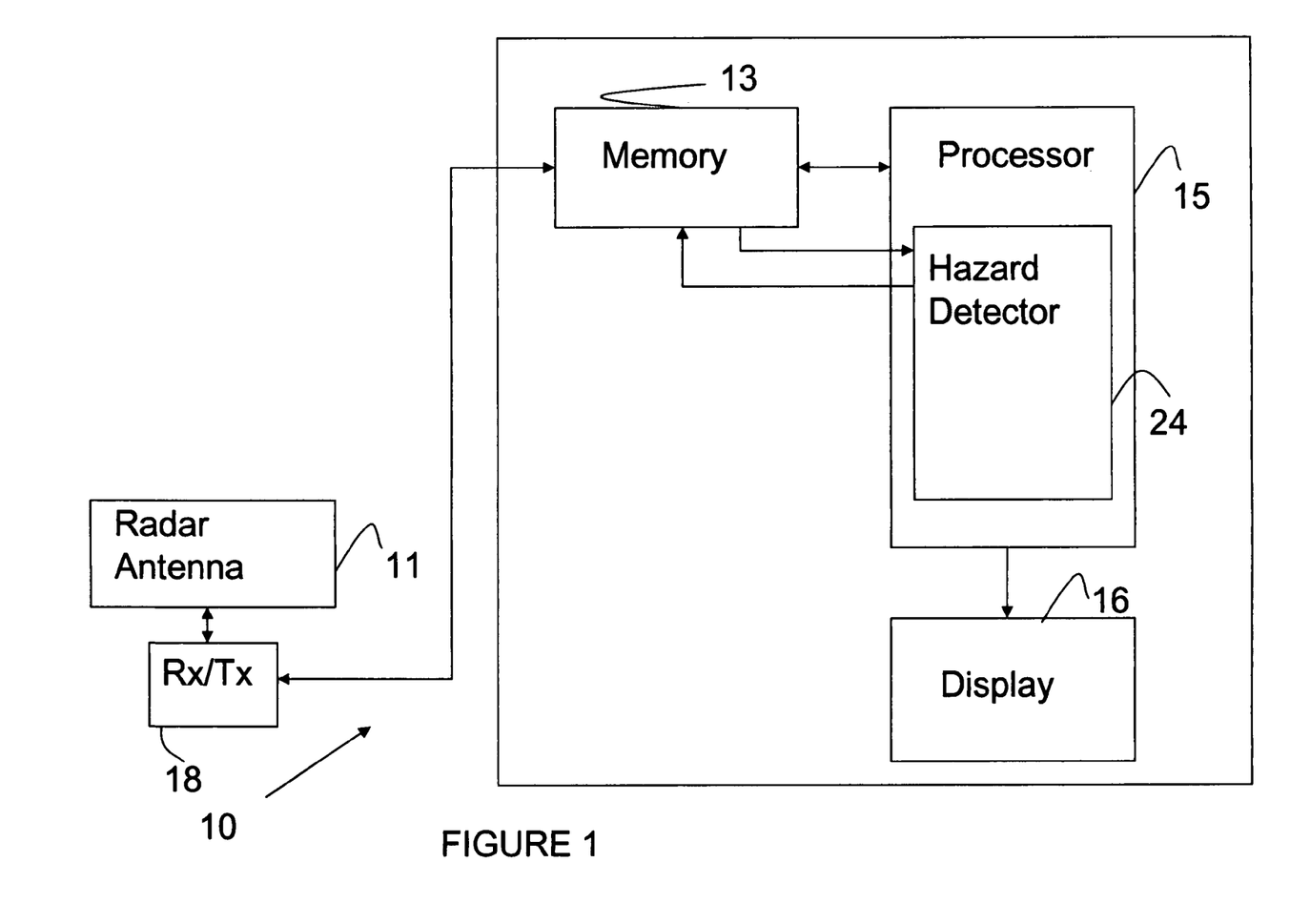
FIG. 1 is an exemplary general block diagram of a weather radar system in accordance with an exemplary embodiment.

Referring now to FIG. 1, a weather radar system 10 which may be used on an aircraft is depicted. Weather radar system 10 can be similar to the system described in U.S. Pat. No. 6,388,608 configured to include a hazard detector 24 (e.g. a lightning detection system and/or a gust strength detection system) as described below. Advantageously, hazard detector 24 provides hazard information, such as gust advisory information and lightning hazard information in the terminal area to improve pilot situational awareness, improve passenger safety, and decrease maintenance due to weather on aircraft.

System 10 preferably includes a radar antenna 11, a processor 15, a memory 13, a display 16 and a receiver/transmitter circuit 18. System 10 is advantageously configured to include hazard detector 24. In a preferred embodiment, hazard detector 24 is part of processor 15. Alternatively, hazard detector 24 can be coupled to processor 15, to another part of system 10, or to other aircraft electronics.

Hazard detector 24 is shown in FIG. 1 as part of processor 15 and as receiving inputs from processor 15 or other components within system 10. However, detector 24 can receive parameters and data from various aircraft instrumentation to make a hazard determination. Detector 24 can be operated in conjunction with the operations of processor 15 or separately from the operations of processor 15. Detector 24 can be embodied as its own software routine operating on its own platform or line replaceable unit.

In a preferred embodiment, weather radar system 10 is a pulse Doppler radar system. System 10 preferably includes a weather radar return processing unit (e.g., processor 15) that can calculate standard deviations of wind velocities, a mean velocity parameter, a spectral width parameter, a range parameter, and reflectivity parameter to generate turbulence alerts, and to provide a display signal to display 16. In one embodiment, system 10 detects reflectivity by measuring the power of the returned signal. Velocity is measured by detecting changes in phase angle of returned pulses. Spectral width is measured by detection variation in change of phase angle of returned pulses.

Display 16 preferably provides color graphical images corresponding to the intensity of the radar returns. The graphical images can represent weather regions, rainfall densities, turbulence regions, etc. Hazard detector 24 causes display 16 to provide visual indications of potential hazards. In one embodiment, audio alerts are also provided.

System 10 can be a multi-scan radar system or similar system manufactured by Rockwell Collins configured to include the features associated with hazard detector 24. According to certain embodiments, system 10 can be an RDR 4000 system or similar system manufactured by Honeywell International, Inc. configured to include the features associated with detector 24. The type of weather radar system is not disclosed in a limiting fashion. The principles of the present invention are applicable to any aircraft weather radar system in which sensing of potential and actual hazards is performed.

Advantageously, system 10 (e.g., hazard detector 24) can determine the presence of a potential hazard, such as a lightning hazard or a wind gust hazard, by utilizing the reflectivity parameter, mean velocity parameter, or the spectral width parameter. Applicants believe that the use of these parameters, which are available on current radar systems, allows reliable prediction of hazards in the terminal area.

Wind gust strength can be estimated via the spectral width parameter or via the mean velocity parameter. The gust strength estimation (e.g. a potential hazard) or predictive gust information can be provided on display 16 via a weather radar indicator similar to current turbulence indications. The threshold for gust strengths can be fixed, i.e., a specific color pattern on display 16 can correspond to an expected range of peak gust velocity. Alternatively, the thresholds can be selected based on aircraft type to correspond to a given speed increase per aircraft pilot's manuals.

A statistical correlation exists between the spectral width detected by weather radar system 10 and peak gust values which can cause aircraft attitude upsets and momentary loss of control. In a preferred embodiment, peak gust value is computed as twice the spectral width value detected by weather radar system 10.

A potential lightning hazard can be detected by system 10 (or hazard detector 24) by utilizing the spectral width parameter. Conventional weather radar systems utilize a similar technique for determining turbulence areas. However, detection of turbulence is not necessarily a sufficient case for triggering a lightning hazard warning. For example, certain weather systems, such as those with large amounts of vertical sheer within horizontal winds provide radar returns that can trigger a turbulence alarm but should not produce a lightning warning.

System 10 can be configured to prevent spurious warnings in response to this type of turbulence. In one embodiment, system 10 evaluates at least one of a weather height parameter, temperature parameter and/or a reflectivity parameter with the spectral width parameter to determine the presence of a lightning hazard.

In a preferred embodiment, a lightning hazard alert is provided if the weather exceeds a height where temperature falls below negative ten degrees Centigrade, where the peak reflectivity value exceeds 30 dBZ, and the spectral width parameter exceeds five meters per second. Reflectivity can be determined by measuring the power of the radar returns received by antenna 11 and applying a series of gains to the resulting value.

Applicants believe that this combination of parameters can be empirically demonstrated to be correlated to weather which produces lightning. Alternate values and combinations of parameters are possible.

Applicants believe that the large number of lightning strikes without either a precursor or subsequent strike can be understood in light of aircraft actively avoiding regions of high-level radar reflectivity that occurred during both the early and mature stages in a thunderstorm's development. Aircraft begin to operate in the vicinity of cells during the dissipating stages of a thunderstorm's life as radar reflectivity falls. Although the dissipating reflectivity may seem insufficient to denote an electrified cell, the cell has been charged in its life. The aircraft penetrating the environment near the dissipating but still charged cell may act as a trigger to allow the cell to discharge through the aircraft.

Accordingly, system 10 preferably can identify cells and their stages of development. System 10 can use height/temperature and spectral characteristics to identify potential lightning producing cells. Those cells are identified as a risk even after it no longer meets the hazard triggering threshold for a period of time. Accordingly, system 10 can include a timer that continues to mark a hazard for a period of time after it no longer meets the hazard triggering thresholds. In one particular embodiment, the period of time can be from 3 to 5 minutes.

Potential lightning hazards can be provided on display 16 in a number of fashions. In one exemplary embodiment, cells that are evaluated as potential lightning hazards can be identified by an icon that encompasses the entire weather cell or an individual threat icon. Alternatively, an individual threat icon can be embedded at the cell center. Further, a color or colored border can be utilized to identify the cell with the potential lightning hazard. In another embodiment, the icon can fade or change color as the period of time (after which the triggering thresholds are no longer met) expires.

The details about system 10 are provided in an exemplary fashion. The principles of the present application are applicable to any weather radar system utilizing radar data for a display. The specific type of calculations are not described in a limiting fashion unless specifically recited in the claims. The various components and circuits described below can be implemented in almost any hardware or software configuration depending upon design parameters and system criteria.

In a preferred embodiment, processor 15 and circuit 24 are implemented in software subroutines. The subroutines can be executed on one or more digital signal processors associated with system 10. In one embodiment, system 10 uses a hardware platform of a WXR-2100 weather radar system manufactured by Rockwell Collins, Inc. or an RDR 4000 weather radar system manufactured by Honeywell International, Inc.

However, the present invention is not limited to any type of hardware platform. In operation, processor 15 of system 10 provides signals, either directly to receiver/transmitter circuit 18 or indirectly through memory 13, to provide radar beams at radar antenna 11. Preferably, processor 15 is configured to operate system 10 as a pulse Doppler multi-scan, multi-tilt angle radar system or a volumetric radar system in which radar beams are produced at more than one tilt angle. Processor 15 receives radar returns through receiver/transmitter circuit 18.

Processor 15 can receive the radar returns (or signals/data related thereto) directly or through memory 13. Receiver/transmitter circuit 18 can be a single path or can have separate circuits for a receive path and a transmit path.

Processor 15 determines at least a reflectivity parameter, a mean velocity parameter and/or a spectral width parameter for use by detector 24.

Figure 2:
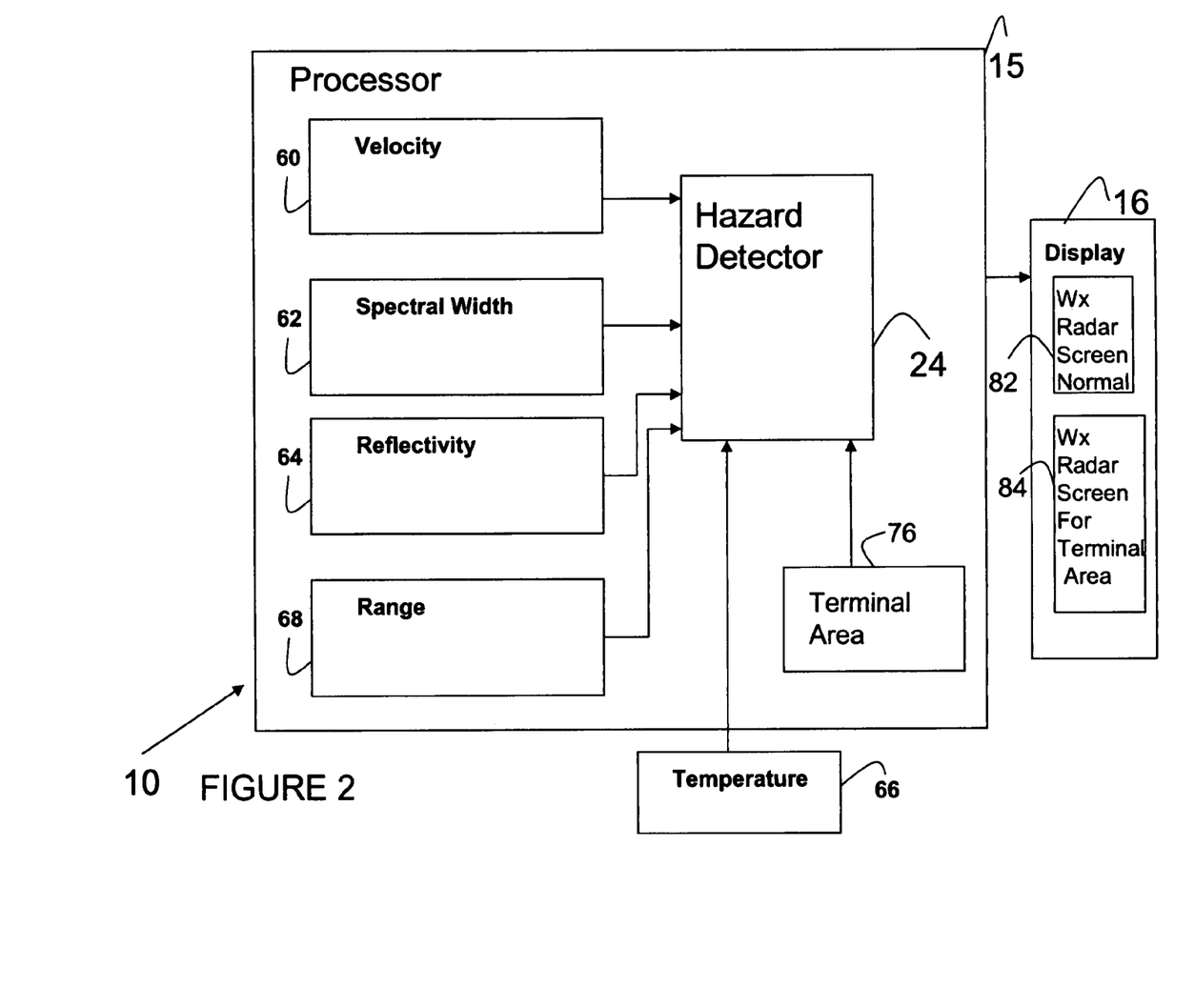
FIG. 2 is a more detailed exemplary general block diagram of a processor for the weather radar system illustrated in FIG. 1 in accordance with another exemplary embodiment.

With reference to FIG. 2, hazard detector 24 preferably receives at least a mean velocity parameter 60 and a spectral width parameter 62 derived from weather radar returns. Alternatively, other types of velocity parameters can be utilized. In addition, processor 15 can provide a reflectivity parameter 64 and a range parameter 68 to hazard detector 24. Computed range or range parameter 68 along with scan angle position is used to plot the position of the hazard on display 16. Processor 15 can also provide a temperature parameter 66. Alternatively, a separate temperature sensor 66 can be provided to hazard detector 24.

Hazard detector 24 can also receive an indication that the aircraft is in a terminal area via a terminal area circuit 76. Terminal area circuit 76 can determine whether the aircraft is in a terminal area via an inertial navigation system, GPS equipment, or pilot action. In one embodiment, terminal area circuit 76 is a switch which can be actuated by a pilot when the aircraft approaches a terminal area. Alternatively, terminal area circuit 76 can automatically determine the mode of flight of the aircraft. Circuit 76 makes a determination that the aircraft is in a terminal area during take off and landing modes. According to another alternative, terminal area circuit 76 can determine whether the aircraft is in a terminal area based upon altitude from an altimeter or other device or from signals from the airport.

Display 16 preferably includes a normal weather radar screen 82 and a terminal area weather radar screen 84. Weather radar screen 84 terminal area preferably includes potential hazard indications such as hazard indications for lightning and gust hazards. Screen 84 can be provided along with or separately from screen 82.

In one preferred embodiment, the pilot can toggle between screens 82 and 84 based upon a manual input. Alternatively, screen 84 can automatically be provided on display 16 when terminal area circuit 76 determines that the aircraft is in a terminal area. Hazard detector 24 can be turned on only when in a terminal area. In such an embodiment, circuit 76 can activate detector 24. Alternatively, detector 24 can continue calculations and the results of its calculations can be displayed on display 16 continuously or when the aircraft is in the terminal area.

Figure 3:
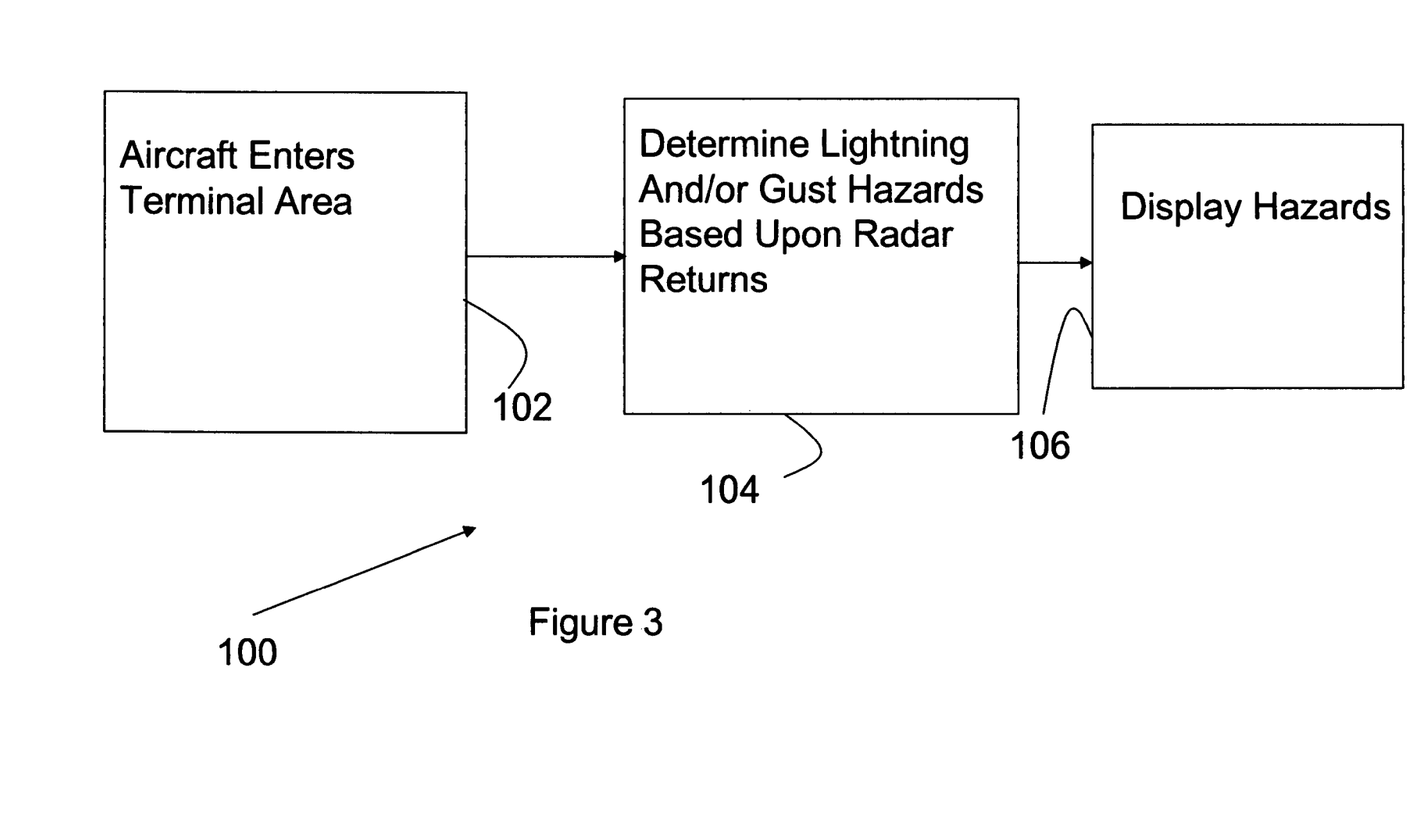
FIG. 3 is a flow diagram showing operation of the weather radar system illustrated in FIG. 1 in accordance with another exemplary embodiment.

As shown in FIG. 3, a flow chart 100 shows one exemplary operation of radar system 10. At a step 102, the aircraft enters a terminal area. Terminal area circuit 76 can be utilized to automatically determine when the aircraft enters a terminal area. Alternatively, a user interface can be utilized so that the pilot can provide an input to system 10 indicating that the aircraft has entered a terminal area. The entry to the terminal area can occur at takeoff or landing. Takeoff begins as the aircraft is accelerating down the runway in preparation for becoming airborne and ends as the aircraft height above ground exceeds a threshold value. Landing begins when the aircraft height above ground falls below a threshold value and ends when the aircraft wheels touch the runway. In one embodiment, when the aircraft is in an approach mode or takeoff mode, hazard detector 24 is turned on and provides indications of potential hazards to display 16. Display 16 can be configured to provide visual indications when received by processor 16 or detector 24.

At a step 104, hazard detector 24 determines the presence of a potential hazard. In one embodiment, the potential hazard can be a potential lightning hazard and/or a wind gust hazard. Hazard detector 24 utilizes at least one parameter based upon radar returns to make the determination. The parameters can include a reflectivity parameter, a spectral width parameter or a wind velocity parameter (e.g. mean wind velocity). Hazard detector 24 preferably obtains the reflectivity parameter, spectral width parameter, or mean velocity parameter from processor 15. At a step 106, the appropriate hazard is displayed on display 16.

Figure 4:
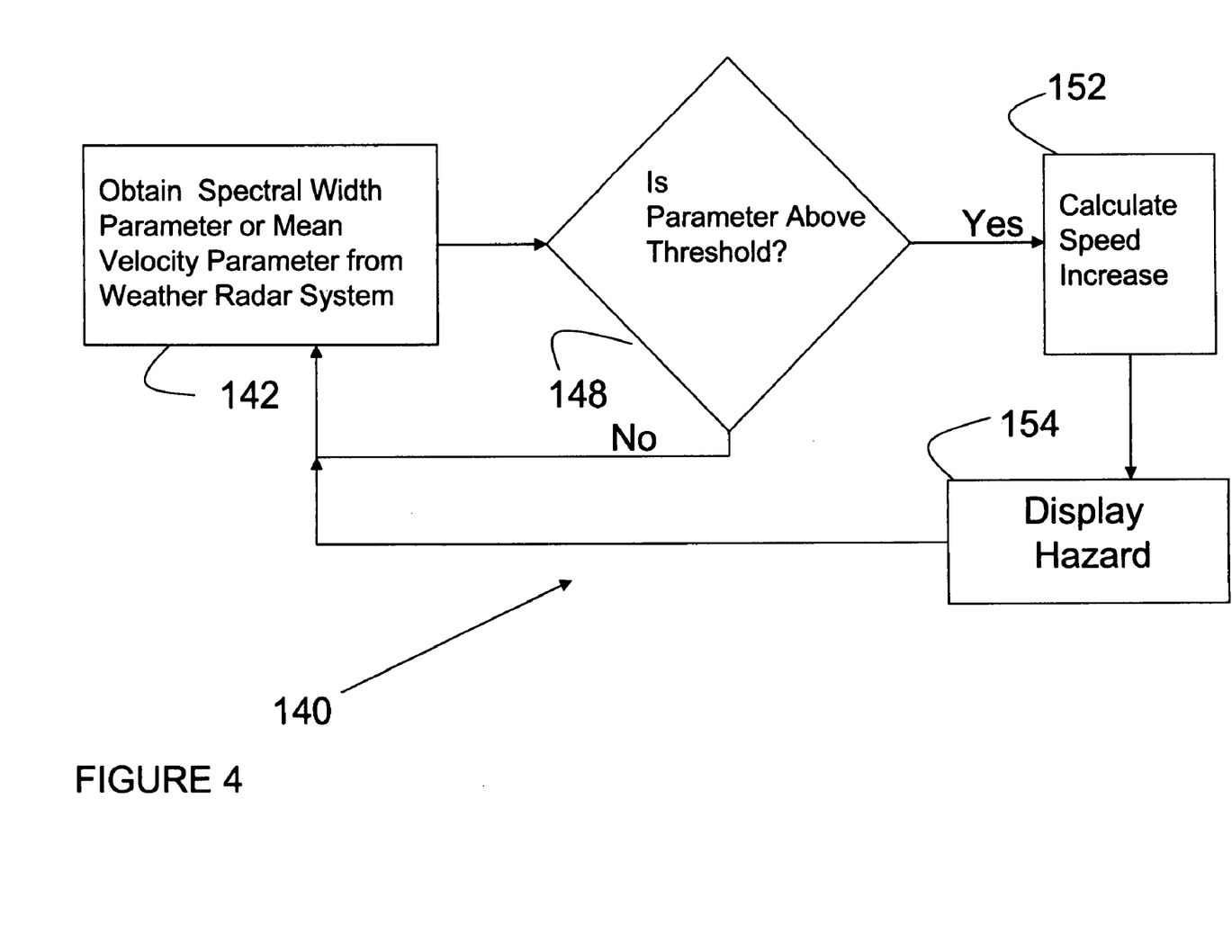
FIG. 4 is a flow chart showing operation of the system illustrated in FIG. 1 in accordance with yet another exemplary embodiment.

With reference to FIG. 4, a flow chart 140 shows an exemplary operation of system 10 for a wind gust hazard. At a step 142, the spectral width parameter or mean velocity parameter is obtained.

At a step 148, detector 24 determines if the spectral width parameter or mean velocity parameter is above a threshold. If so, a hazard is displayed at a step 154. If not, system 10 returns to step 142.

At step 152, a speed increase can be calculated by detector 24 to provide a pilot with the necessary speed increase in the event of a gust condition. The speed increase can be determined based upon the type of aircraft, the weight of aircraft, or other conditions. The speed increase can be displayed on display 16.

Figure 5:
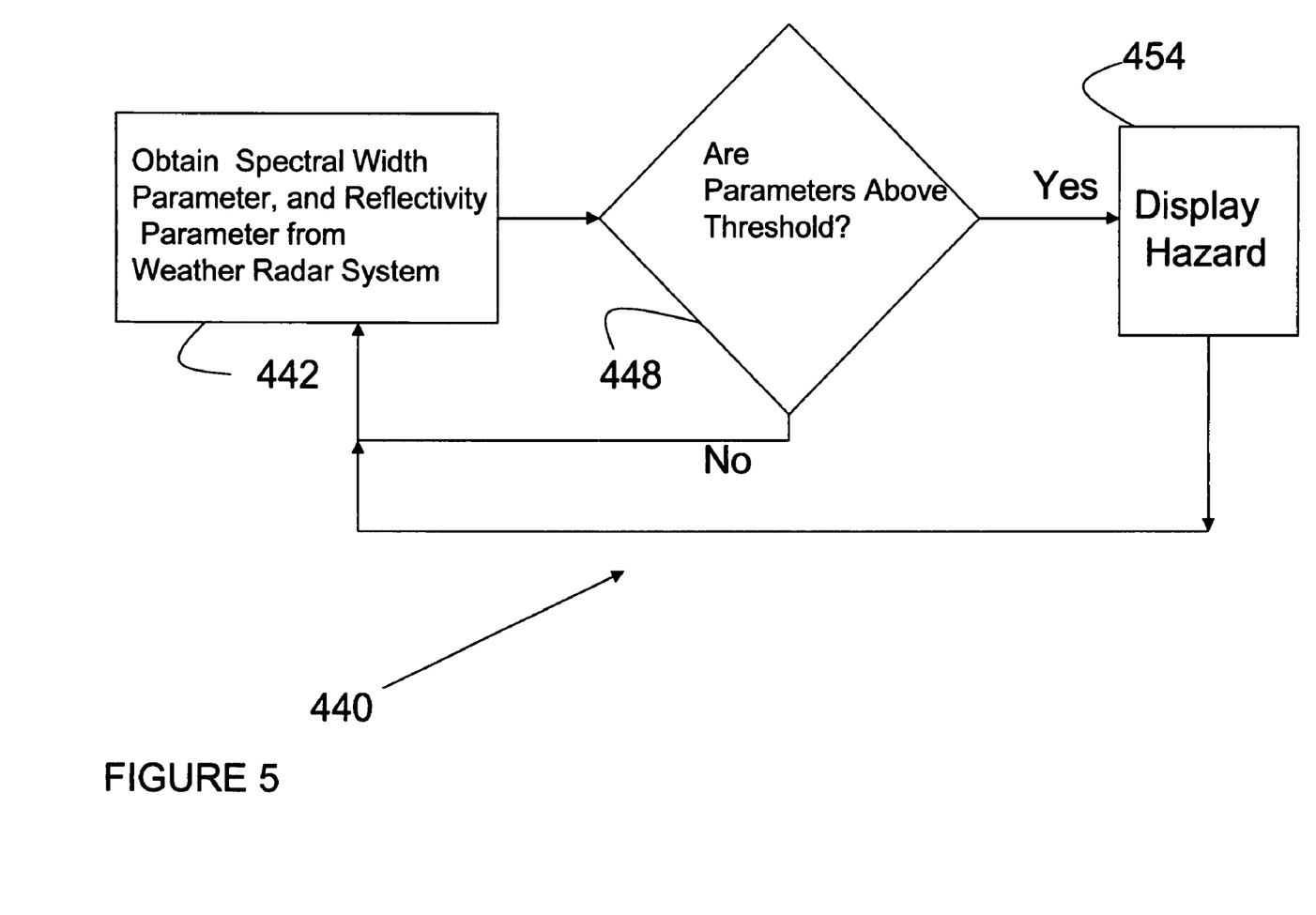
FIG. 5 is a flow diagram showing operation of the system illustrated in FIG. 1 in accordance with still another exemplary embodiment.

With reference to FIG. 5, a flow chart 440 shows another exemplary operation of system 10. At a step 442, system 10 obtains a spectral width parameter and a reflectivity parameter from weather radar system 10. At a step 448, detector 24 determines whether the spectral width parameter and reflectivity parameter are above a threshold to determine the presence of a lightning hazard. In one embodiment, the reflectivity parameter is compared to a threshold of 30 dBZ and the spectral width parameter is compared to a threshold of five meters per second. The measured temperature parameter is used to compute the temperature at the top of the weather cell. If the reflectivity parameter and spectral width parameter are each above their respective thresholds, and the temperature at the top of the weather cell falls below its threshold, a hazard is displayed at a step 454. If not, system 10 returns to step 442.

In addition, at step 442, other criteria can be considered or provided in an algorithm utilized by hazard detector 24.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and mathematical operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar system for an aircraft, comprising:
   a weather radar antenna; and
   processing electronics, coupled to the weather radar antenna, for determining a presence of a potential hazard in a terminal area, the processing electronics determining a presence of the aircraft in or near a terminal area and determining a spectral width parameter or a mean velocity parameter, the spectral width parameter being related to returns received by the weather radar antenna, the mean velocity parameter being related to returns received by the weather radar antenna, the processing electronics determining the presence of the potential hazard in the terminal area based upon at least one of the spectral width parameter, or the mean velocity parameter.

2. The weather radar system of claim 1, wherein the processing electronics determines a reflectivity parameter and the potential hazard is a lightning hazard.

3. The weather radar system of claim 2, wherein the presence of the lightning hazard is determined from the spectral width parameter and the reflectivity parameter.

4. The weather radar display system of claim 3, wherein the presence of the lightning hazard is determined using a weather height parameter.

5. The weather radar display system of claim 4, wherein the presence of the lightning hazard is determined using a temperature parameter.

6. The weather radar system of claim 1, wherein the potential hazard is a wind gust hazard.

7. The weather radar system of claim 6, wherein the processing electronics calculates a speed increase for the aircraft based upon the presence.

8. The weather radar system of claim 7, wherein the processing electronics determines the presence of the potential hazard using an aircraft type parameter.

9. The weather radar system of claim 6, wherein the presence of the wind gust hazard is determined by a peak gust value.

10. The weather radar system of claim 9, wherein the peak gust value is computed using twice the spectral width parameter.

11. The weather radar system of claim 1, further comprising a display, wherein an indication of the potential hazard is displayed.

12. The weather radar system of claim 11, wherein the display provides a normal screen for general use outside the terminal area and a terminal screen area hazard for displaying the indication.

13. The weather radar system of claim 11, wherein the display shows a color pattern, a dotted line, a hatched area or an icon for the indication.

14. The weather radar system of claim 13, wherein the color pattern, a dotted line, hatched area or icon encompasses an entire weather cell or an individual threat.

15. The weather radar system of claim 1, wherein the weather radar system is a pulse Doppler radar system.

16. A method of displaying a potential hazard in a terminal area of an aircraft, the method comprising:
receiving radar returns using a radar system;
determining a first parameter related to the radar returns, the first parameter being a spectral width or a mean velocity;
determining a location of the aircraft being in or near the terminal area; and
providing an indication on a display or an audio device of a presence of the potential hazard based upon the first parameter.

17. The method of claim 16, further comprising determining a peak velocity.

18. The method of claim 16, wherein the indication is provided for a period of time after the first parameter or at least one other parameter no longer indicate that the potential hazard is present.

19. The method of claim 18, wherein the icon, color pattern, dotted outline, or hatched area fades or changes color as the period of time expires.

20. The method of claim 16, wherein the indication is a symbol on the weather radar display.

21. The method of claim 16, wherein the potential hazard is a wind gust hazard or a lightning hazard.

22. The method of claim 16, wherein the method is performed during an approach or take-off.

23. The method of claim 16, wherein the indication is an icon, color pattern, dotted outline, or hatched area on the weather radar display.

24. The method of claim 16, wherein determining a location of the aircraft being in or near the terminal area is done automatically.

25. The method of claim 16, wherein the indication is an indication of a lightning hazard or wind gust hazard and the indication is provided for at least 3 minutes after triggering thresholds are no longer met.

26. The method of claim 16, wherein determining a location of the aircraft being at or nearby a terminal area is in response to a manual input from an operator.

27. An apparatus for determining a potential hazard for an aircraft, the apparatus comprising:
means for determining a first factor from the weather radar returns, the first factor being a spectral width or mean velocity;
means for determining a presence of the potential hazard in response to the first factor and the aircraft being in a terminal area; and
means for displaying an indication of the potential hazard.

28. The apparatus of claim 27, wherein the potential hazard is a wind gust hazard or a lightning hazard and the means for determining a presence is implemented using software.

29. The apparatus of claim 27, wherein the indication of the potential hazard is displayed as a color, dotted outline, or hatched area on a weather radar display.

30. The apparatus of claim 27, wherein the indication of the potential hazard is displayed on a terminal area hazard screen of a weather radar display.

31. The apparatus of claim 30, wherein the potential hazard is lightning and the means for determining a presence utilizes an altitude, a reflectivity, or a temperature.

32. The apparatus of claim 31, wherein a lightning hazard alert is provided if the weather exceeds a height where the temperature falls below negative ten degrees Centigrade, the peak reflectivity value exceeds 30 dbZ, and the spectral width parameter exceeds five meters per second.

33. The apparatus of claim 30, wherein the potential hazard is a wind gust and the means for determining a presence utilizes a spectral width parameter or a mean velocity parameter.

* * * * *